Oct. 8, 1968 R. T. HART 3,405,364
REFLEX QUENCHED SUPERREGENERATIVE DETECTOR
Filed June 30, 1965 2 Sheets-Sheet 1

INVENTOR.
ROBERT T. HART
BY Mosely & Hallacher
ATTORNEYS

REFLEX QUENCHED SUPERREGENERATIVE DETECTOR

Filed June 30, 1965 2 Sheets-Sheet 2

INVENTOR.
ROBERT T. HART
BY Hardy & Hallacher
ATTORNEYS

United States Patent Office 3,405,364
Patented Oct. 8, 1968

3,405,364
REFLEX QUENCHED SUPERREGENERATIVE DETECTOR

Robert T. Hart, Cedar Rapids, Iowa, assignor to Collins Radio Company, Cedar Rapids, Iowa, a corporation of Iowa Filed June 30, 1965, Ser. No. 468,249
7 Claims. (Cl. 329—122)

ABSTRACT OF THE DISCLOSURE

Disclosed is a superregenerative detector circuit including a first circuit portion which constitutes an astable multivibrator, a second circuit portion which constitutes an R-F oscillator, said first and second circuit portions having a common electron control means or transistor. The R-F oscillator portion is coupled to an antenna system and receives a modulated R-F signal therefrom. The frequency of the multivibrator portion is lower than the R-F oscillator portion frequency and greater than the modulation frequency of the received signal.

This invention relates generally to radio receivers and particularly to a quenching circuit for a radio oscillator.

As is well known in the art a superregenerative receiver is an R-F amplifier having sufficient positive feedback to cause oscillation. The receiver is caused to go in and out of oscillation by a control signal known as the quench signal.

Two types of quench circuits are presently available in the art: self-quenched and externally quenched. An example of a self-quenched receiver is found in "Electronic Designers Handbook" by Landee, Davis and Albrecht, McGraw-Hill, 1957, at page 7—123. An externally quenched receiver is shown in U.S. Patent No. 2,511,086 issued to Tellier et al. This invention is different from both of these and therefore establishes a third category which is defined hereinafter as reflex quenching.

Conventional superregenerative detectors utilizing a self-quenched oscillator are inherently critical of operating parameters and components for satisfactory operation. External quenching resolves these problems at the expense of added components.

The present invention is directed to a circuit which overcomes the limitations described above in conventional superregenerative detectors.

It is therefore an object of this invention to provide a reflex quenched receiver which is less critical to operating parameters.

It is another object of this invention to provide a circuit which permits the receiver frequency to be crystal controlled for the purpose of frequency stability and for the additional purpose of enhancing the frequency selectivity of the superregenerative detector.

It is still another object of this invention to provide a pulse symmetry detector as a means of converting the moduation from a received signal to audio frequencies in lieu of the more conventional systems.

It is a further object of this invention to provide a pulse symmetry detector to the reflex circuit as a means of deriving a voltage which has a value proportional to received signal level.

Further objects, features and advantages of the invention will become apparent from the following description and claims when read in view of the accompanying drawings, in which:

The principle of the present invention in its complete form will be understood by referring to FIGURES 1 through 6 and the explanations thereof in the following paragraphs.

Figure 1:
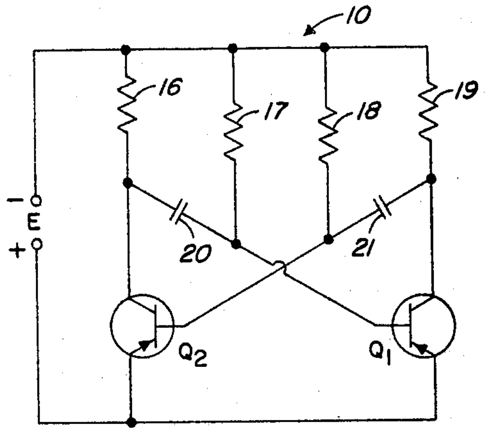
FIGURE 1 is a diagram of a typical astable multivibrator.

FIGURE 1 shows an astable multivibrator 10, the operation of which is well-known in the art. For example, see page 8—7 of the hereinabove referenced handbook.

Figure 2:
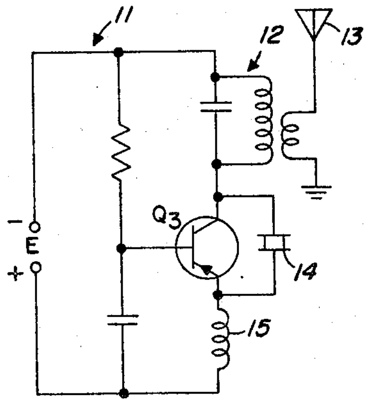
FIGURE 2 is a diagram of a typical crystal controlled radio frequency oscillator.

FIGURE 2 shows an R-F oscillator 11 which is also well-known in the art. See, for example, page 6—23 of the hereinabove referenced handbook.

Although the handbook shows the use of tubes while the invention shows transistors the teachings are nevertheless pertinent as these two elements are the full electrical equivalents for circuits of this type. For this reason the invention can also utilize tubes in place of any transistor shown in the figures.

Figure 3:
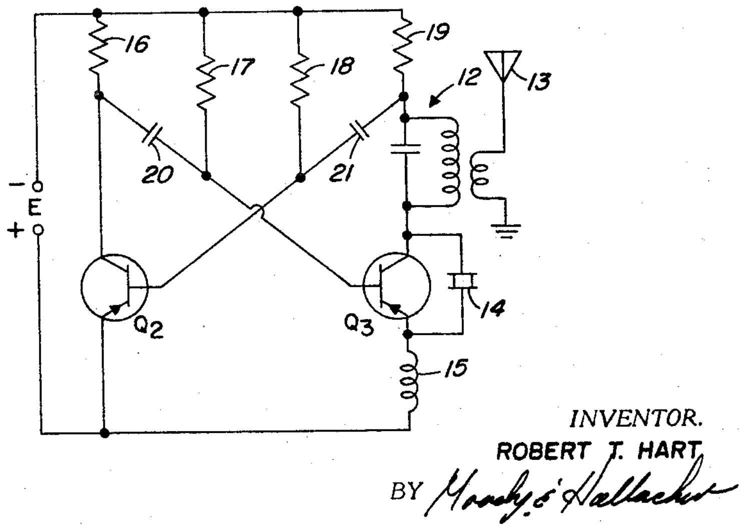
FIGURE 3 is a diagram of the circuits of FIGURES 1 and 2 combined as a reflex quenching circuit.

In FIGURE 3 the conventional astable, or free running, multivibrator 10 is combined with radio frequency oscillator 11. The combination is made by substituting tuned circuit 12, crystal 14, choke 15, and transistor $Q_3$ of the oscillator 11 for transistor $Q_1$ of multivibrator 10. The operation of both oscillator 11 and multivibrator 10 now obviously depends on the characteristics of transistor $Q_3$. The frequency of the multivibrator is much lower than that of the radio frequency oscillator. As the multivibrator oscillates, the two transistors alternate between conduction and nonconduction with one being on while the other is off, each transistor changes conduction states each half cycle of the multivibrator frequency. The basic frequency is controlled by the RC time constants utilizing appropriate values for resistors 16 to 19 and capacitors 20 and 21.

During the time transistor $Q_3$ is in the conducting state caused by the multivibrator action, it is also oscillating at a frequency determined by the characteristics of the radio frequency components, in the radio frequency oscillator portion of the circuit. Therefore, during each half cycle of the multivibrator frequency when $Q_3$ is in the conducting state, $Q_3$ functions as a radio frequency oscillator and is turned off on the other half cycle of the multivibrator action.

When $Q_3$ is allowed to conduct, the radio frequency oscillations are caused to start by noise inherent in the circuit, as is the cause of oscillations in any circuit. In this case, the rate of buildup of the oscillations is influenced by radio frequency signals of the appropriate frequency injected in the circuit through coupling to an antenna system. If a radio frequency signal is present at the antenna and associated coupling circuits each time $Q_3$ begins conduction, and if the external radio frequency signal is modulated, the oscillations will build up at a rate influenced by the modulation as well as the signal strength.

As this effect varies the state of conduction of $Q_3$, it also affects the operation of the multivibrator, causing a change in the symmetry of the basic square wave produced by the multivibrator. The frequency of the multivibrator is chosen to operate at a higher frequency than the modulation frequency, thus allowing the rate at which the symmetry of the basic square wave changes to approximate that of the modulation.

While the rate of change of symmetry follows the modulation frequency, the symmetry ratio changes directly as a function of the modulation amplitude. For this reason the symmetry ratio is proportional to received signal strength. (This is explained in F. E. Terman, "Electronics and Radio Engineering," copyright 1955 by McGraw-Hill Book Company, Inc., Library of Congress Catalog Card #55–6174, pp. 566–568.) To utilize this characteristic, additional circuitry 22 is made to the circuit of FIGURE 3 to produce the complete receiver circuit shown in FIGURE 4. This additional circuitry 22 is called a pulse symmetry detector and filter. Its performance is defined as follows:

The two transistors $Q_4$ and $Q_5$ operate as switches driven by the switching waveform from the multivibrator. The two transistors alternately conduct causing the voltage potential of point 23 at which the two emitters are jointed to be alternately (+) or (−) as a means of amplifying the basic square wave of the multivibrator. This voltage, derived from voltage sources $E_1$ and $E_2$, is then processed through an RC filter 24 and applied to the meter and earphone unit. Sustained variations in the symmetry ratio will cause the meter to deflect an amount proportional to the level of the received signal strength. Rapid variations in symmetry ratio cause the earphone unit to produce audible sounds representing the modulation on the received signal.

Figures 4, 5:
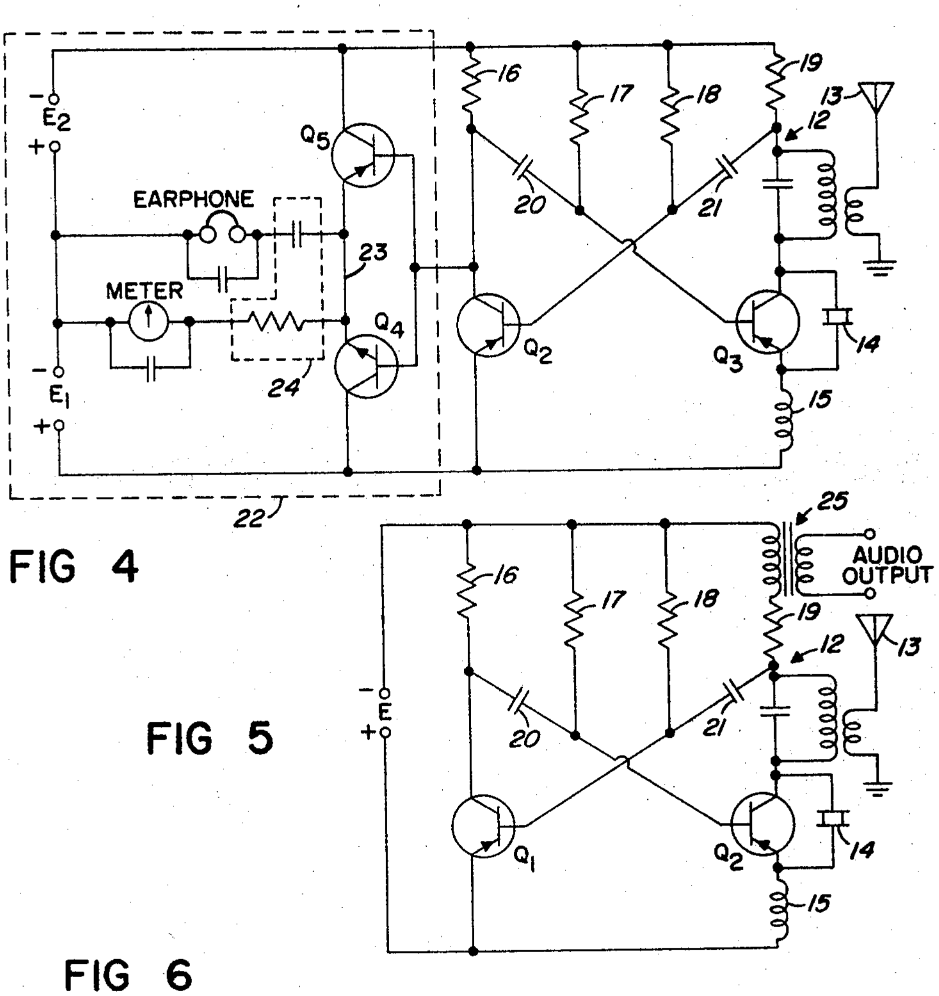
FIGURE 4 is a pulse symmetry detector with a filter added to the circuit of FIGURE 3 to form the completed receiver.
FIGURE 5 shows another embodiment of the invention.
Figure 6:
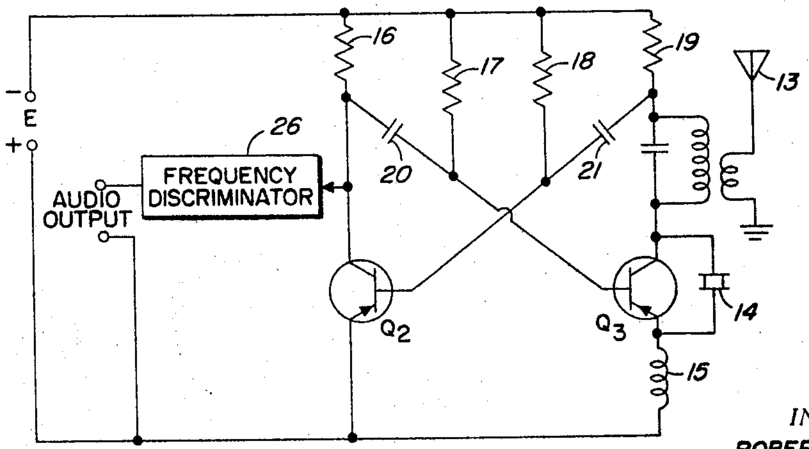
FIGURE 6 shows still another embodiment of the invention.

While a complete receiver is shown in FIGURE 4, other variations as to the method in which the audio signals are derived from the basic reflex quenching circuit are possible. Two variations are shown in FIGURES 5 and 6. FIGURE 5 shows the use of a load impedance 25 in the form of a transformer in the transistor current path across which audio voltages are developed. These voltages are a function of the modulation of the received signal. This is the normally used method of deriving auido signals from superregenerative detectors. FIGURE 6 shows the use of a frequency discriminator 26 wherein the quenching frequency signals from the reflex detector are applied to the discriminator and audio signals are developed due to the amplitude modulation on a received signal causing the frequency of the multivibrator to vary at the audio rate.

Although this invention has been described with respect to particular embodiments thereof, it is not to be so limited as changes and modifications may be made therein which are within the spirit and scope of the invention as defined by the appended claims.

I claim:

1. A reflex quenched superregenerative detector first circuit comprising a circuit portion constituting a multivibrator, a second circuit portion constituting an R-F oscillator, said first and second circuit portions having a common electron control means and means for coupling said oscillator to an antenna system.

2. A reflex quenched superregenerative detector circuit as defined by claim 1 wherein the frequency of said multivibrator is less than the frequency of said R-F oscillator, and wherein said R-F oscillator functions only when said common electron control means of said multivibrator is conducting.

3. A reflex quenched superregenerative detector circuit as defined by claim 1 wherein said antenna system is tuned to receive a modulated signal, and wherein the frequency of said multivibrator portion is higher than the modulation frequency.

4. A reflex quenched superregenerative detector circuit as defined by claim 1 and further including a pulse symmetry detector and filter for detecting the symmetry ratio of said multivibrator and producing a demodulated signal.

5. A reflex quenched superregenerative detector circuit as defined by claim 1 wherein said R-F oscillator includes an audio transformer for producing an output signal which is a function of the modulation of the received signal.

6. A reflex quenched superregenerative detector circuit as defined by claim 1 and including a frequency discriminator operably connected with said multivibrator for developing a signal which is a function of the modulation of the received signal.

7. A reflex quenched superregenerative detector circuit comprising:

(a) a first circuit portion constituting a multivibrator,
(b) a second circuit portion constituting an R-F oscillator,
(c) said first and second circuit portions having a common transistor element,
(d) said R-F oscillator being operative only when said common transistor element of said multivibrator is conducting,
(e) means for coupling said R-F oscillator to an antenna system tuned to receive a modulated R-F signal,
(f) means for monitoring the detected modulation signal.

References Cited

UNITED STATES PATENTS

| | | | |
|---|---|---|---|
| 2,070,647 | 2/1937 | Braaten | 331—159 X |
| 2,553,219 | 5/1951 | Tellier | 329—122 X |
| 2,554,308 | 5/1951 | Miller | 331—54 |
| 3,119,065 | 11/964 | Blake | 329—170 X |
| 3,337,807 | 8/1967 | Brown | 325—350 X |
| 2,589,455 | 3/1952 | Tellier | 325—350 |

ALFRED L. BRODY, *Primary Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,405,364 October 8, 1968

Robert T. Hart

It is certified that error appears in the above identified patent and that said Letters Patent are hereby corrected as shown below:

Column 3, line 48, cancel "first"; line 49, after "a", second occurrence, insert -- first --.

Signed and sealed this 17th day of February 1970.

(SEAL)

Attest:

Edward M. Fletcher, Jr.

Attesting Officer

WILLIAM E. SCHUYLER, JR.

Commissioner of Patents